(12) United States Patent
Eden et al.

(10) Patent No.: US 9,800,011 B2
(45) Date of Patent: Oct. 24, 2017

(54) DUAL CHANNEL METHOD FOR PUMPING AND COOLING LASERS AND LASER DEVICE

(71) Applicant: The Board of Trustees of the University of Illinois, Urbana, IL (US)

(72) Inventors: J. Gary Eden, Champaign, IL (US); John Darby Hewitt, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/149,396

(22) Filed: Jan. 7, 2014

(65) Prior Publication Data

US 2017/0201060 A1    Jul. 13, 2017

Related U.S. Application Data

(60) Provisional application No. 61/749,859, filed on Jan. 7, 2013.

(51) Int. Cl.
*H01S 3/094* (2006.01)
*H01S 3/22* (2006.01)
*H01S 3/04* (2006.01)
*H01S 3/095* (2006.01)

(52) U.S. Cl.
CPC ...... *H01S 3/094096* (2013.01); *H01S 3/2207* (2013.01); *H01S 3/0408* (2013.01); *H01S 3/095* (2013.01); *H01S 3/094092* (2013.01)

(58) Field of Classification Search
CPC ......... H01S 3/094092; H01S 3/094096; H01S 3/095
See application file for complete search history.

(56) References Cited

U.S. PATENT DOCUMENTS

| 5,274,658 | A  | * | 12/1993 | Case et al. ..................... 372/69 |
| 5,447,032 | A  | * | 9/1995 | Epstein et al. .................. 62/3.1 |
| 6,643,311 | B2 | * | 11/2003 | Krupke .......................... 372/56 |
| 7,804,877 | B2 |   | 9/2010 | Verdeyen et al. |
| 2009/0052482 | A1 | * | 2/2009 | Vermeulen et al. ........... 372/34 |

OTHER PUBLICATIONS

Page, Ralph, H., et al., "Multimode-diode-pumped gas (alkali-vapor) laser", Optics Letters, vol. 31, Issue 3, (2006) pp. 353-355.

* cited by examiner

*Primary Examiner* — Allen Parker
*Assistant Examiner* — Sean Hagan
(74) *Attorney, Agent, or Firm* — Greer, Burns & Crain, Ltd.; Steven P. Fallon (57) ABSTRACT

A laser pumping method pumps a primary amount of energy into a laser medium to populate an intermediate level near an upper laser level. A lesser amount of energy is pumped into the laser medium to populate an excited level that lies above the upper laser level and transfers atomic or molecular population to the upper laser level by a nonradiative process. A laser device includes a laser medium supporting four levels, including a lower laser level, an upper laser level, an excited level above the laser level from which population transfers to the upper laser level via nonradiative transition, and an intermediate level within a few kT of the upper laser level.

22 Claims, 9 Drawing Sheets

DUAL CHANNEL METHOD FOR PUMPING AND COOLING LASERS AND LASER DEVICE

PRIORITY CLAIM AND REFERENCE TO RELATED APPLICATION

The application claims priority under 35 U.S.C. §119 from prior provisional application Ser. No. 61/749,859, which was filed Jan. 7, 2013.

STATEMENT OF GOVERNMENT INTEREST

This invention was made with government support under grant no. FA95550-10-1-0456 awarded by the U.S. Air Force Office of Scientific Research. The government has certain rights in the invention.

FIELD

The field of the invention is lasers. The invention can be applied, for example, to infrared, visible and ultraviolet lasers, and is suitable to be used in solid state, gas and liquid lasers. A preferred application of the invention is to high-power lasers, e.g. YAG lasers, dye lasers, and to Ti-Sapphire lasers.

BACKGROUND

Figure 1A:
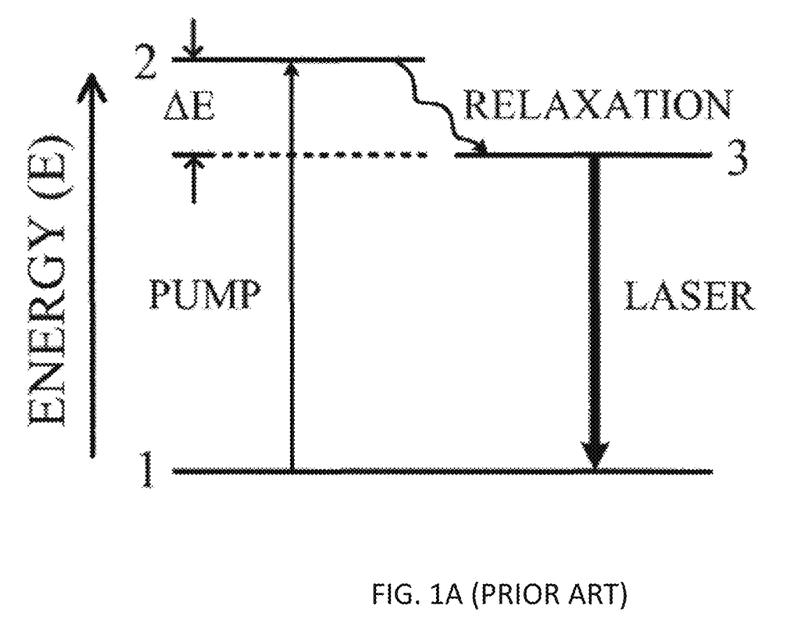
FIG. 1A (PRIOR ART) shows the conventional energy diagram that represents laser operation.

Generating stimulated emission normally requires that a population inversion be established between two energy levels (also referred to as states in the art) of an atom or molecule. Populating the upper laser level cannot be accomplished directly from the lower laser level, but rather requires the presence of at least one highly excited level through the pumping process and pump power must flow. Three level laser systems employ one highly excited level and lasing can occur between two excited levels or, alternatively, the lasing transition can terminate at ground. FIG. 1A illustrates the principles of a three level system in which the ground level of the lasing species is the terminus of the lasing transition.

From a conceptual perspective, three level systems are the simplest in existence, and provide a convenient example to illustrated laser pumping theory. Virtually all three level lasers demonstrated to date (and all continuous wave [CW] lasers) have the generalized energy structure illustrated in FIG. 1A. An electrical or optical pump source excites and transfers atoms (or molecules) from Level 1 (sometimes referred to as a lower laser level) to Level 2 (sometimes referred to as a highly excited level). Following a fast, radiationless relaxation of the Level 2 population to Level 3 (sometimes referred to as an upper or upper metastable laser level) by any of a variety of processes (collisions, multiphonon interactions, fluorescence, etc.), lasing occurs on the 3→1 transition via a relatively slow transition. Although this simple system has proven to be highly successful and provided practically useful devices for many applications, it often suffers from several drawbacks. The drawbacks include low quantum efficiency and inefficient relaxation of Level 2.

The quantum efficiency for the laser of FIG. 1A is limited by $\Delta E$, the energy separation between Levels 2 and 3. A significant difficulty is that the energy $\Delta E$ is dissipated as heat. That is, the fraction:

$$\frac{\Delta E}{E_2} = \frac{E_2 - E_3}{E_2}$$
$$= 1 - E_3/E_2$$

represents the percentage of the energy of every pump photon (assuming that the laser is optically pumped) that is not recovered in the laser output. For a typical three level laser, this percentage is at least 5-10%. In many applications, this energy loss not an important concern, e.g., lasers that are pulsed because the laser is "off" much longer than it is "on."

High power lasers that are continuous or have a duty cycle (the percentage of time that the laser is operational) greater than 5-10%, present different problems. In continuous and high duty cycle lasers, the rejection of heat resulting from $\Delta E$ in FIG. 1A can be (and generally is) a serious problem. At a minimum, heating of the laser medium will distort the output laser beam. In cases where the laser medium is a crystal, catastrophic damage of the crystal can result. Inefficient relaxation is also another problem. The excitation transfer step (radiationless transition from Level 2 to Level 3) is difficult to implement as hydrocarbon, which is used to relax the population from Level 2 to Level 3, causes pyrolyzing problems that produces "soot" in the laser.

Efficiently relaxing the population of Level 2 into Level 3 can also present serious engineering issues. For example, three level lasers in the akali atoms Cs and Rb have been developed that require the use of a hydrocarbon molecule such as ethane ($C_6H_6$) to relax the population of Level 2 into Level 3. However, because the laser medium must be heated so as to obtain a suitable pressure of the alkali metal vapor, the hydrocarbon will slowly pyrolyze (decompose) as the temperature system is raised.

DPAL (diode-pumped alkali lasers) are a newer class of laser that pump atomic alkali vapors with diode arrays. See, e.g., Krupke et al, "Multimode-diode-pumped gas (alkali-vapor) laser," Optics Letters, Vol. 31, Issue 3, pp. 353-355 (2006). In that example, a volume-Bragg-grating stabilized pump diode array pumped Rb vapor. The laser operated on the 795 nm resonance $D_1$ (lasing) transition. Prior work by Krupke et al. used a titanium sapphire laser as a pump to create population inversions and laser operation on the 795 nm resonance $D_1$ (lasing) transition of Rb. These laser systems also pump the 1→2 transition.

Increasing the DPAL lasers to the kW power level and beyond would be difficult. Various engineering barriers exist. For example, the Rb $D_2$ Linewidth (broadened by ~1 atm He or ethane)≈10 GHz. Linewidth narrowing is needed with volume Bragg gratings. Electronic stabilization of the diode array wavelength is also required.

The laser transition defines different types of laser system. In conventional three level systems the laser transition is to ground Level 1 (the lower laser level in a three level system). There are also four level laser systems. An example medium that provides four level operation is Nd:YAG. In a conventional four level laser, the laser transition is to a lower laser level slightly above the ground level. A natural depopulation then occurs to the ground level, and this is another fast radiationless transition. In the conventional three and four level systems, the population inversion is achieved in the same manner. Energy pumps population from 1→2, as shown in FIG. 1A with respect to a three level laser.

Some lasers are optically pumped, e.g., the DPAL lasers that are pumped with diode arrays. The 1→2 pumping transition of FIG. 1A presents another potential obstacle to obtaining efficient operation of the laser system when the system is optically pumped. In an optically pumped system, the pumping transition from 1→2 suffers from poor absorption. Pump energy is wasted, rendering the laser system less efficient.

Verdeyen, Eden, Carroll, Readle and Wagner U.S. Pat. No. 7,804,877 is directed toward Atomic Lasers with Exciplex Assisted Absorption. In the '877 Patent, the optical cavity includes a van der Waals complex of an alkali vapor joined with a polarizable rare gas. The pair is referred to as an exciplex. An example pair is the CsAr pair illustrated in FIG. 6 of the '877 Patent. The generalized pair is illustrated in FIG. 5. The primary examples are alkali-rare gas pairs, though mercury and other polarizable molecules such as ethane and methane are identified as possible substitutes for the polarizable rare gas molecule. The alkali-rare gas atomic pairs are photo pumped in the band known as the blue satellite for the D2 transition of the alkali atom. As a result, the atomic pair is excited (promoted in energy) to the repulsive B state of the alkali-rare gas diatomic molecule. The rapid dissociation of the molecules in this B state results in populating an excited state of the alkali atom that serves as the upper state for the D2 transition of the alkali atom. A similar process can be used to populate higher-lying excited states of the alkali atom. Lasing is obtained on at least two transitions of an alkali atom without necessity of collision relaxation of one level to the other. Rapid dissociation of the alkali-rare gas molecule is used to populate the upper laser level. The lasers and pumping method of the '877 Patent use a single pump that is away from the atomic resonance on the satellite band. In a transversely pumped example of FIG. 11, diodes are on opposite sides of the medium, but this is for uniform pumping and is in the satellite band.

Figure 1B:
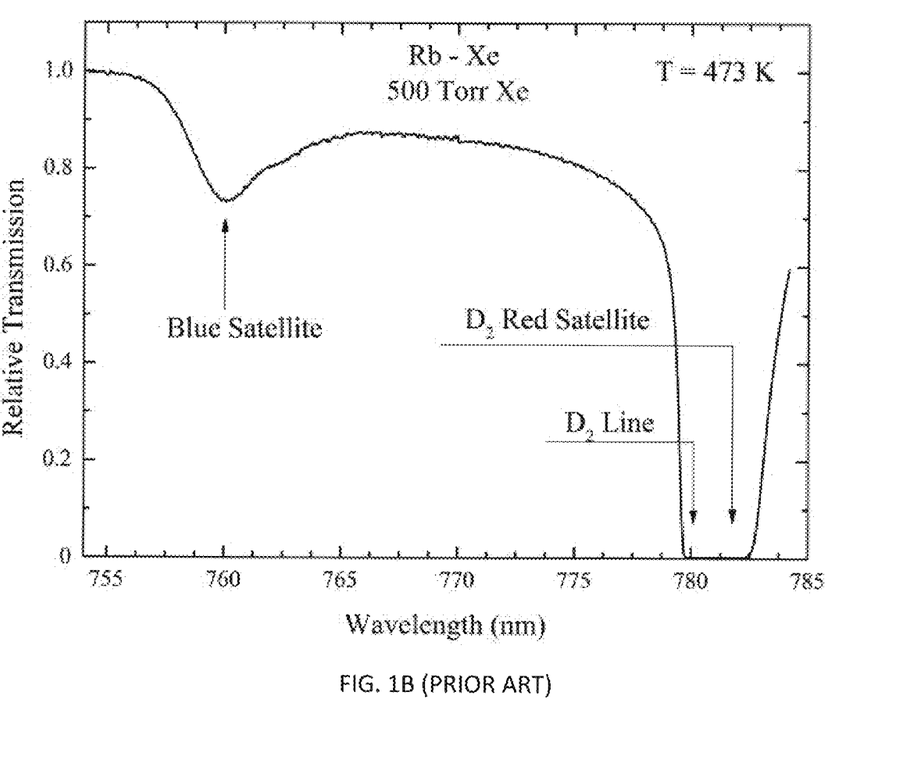
FIG. 1B (PRIOR ART) is an absorption spectrum recorded for a mixture of rubidium (Rb) vapor and Xe gas illustrating a laser system and pumping in accordance with U.S. Pat. No. 7,804,877.

Efficient operation (or any lasing at all) within the methods of the '877 Patent requires that the separation in energy between the selected satellite pump band and laser photons must be greater than, or comparable to, kT (thermal energy). An example consistent with the methods and systems of the '877 Patent is shown in FIG. 1B which is an absorption spectrum recorded for a mixture of rubidium (Rb) vapor and Xe gas. The optical transmission through a column of this vapor/gas mixture is given as a function of wavelength in the 755-785 nm spectral region. Absorption increases downward in this graph, and the positions of the D2 line of Rb (wavelength of approximately 780 nm) and the blue satellite of the D2 line of Rb in Xe are also indicated. The energy separation between the peak of the blue satellite and the D2 line position is 337 wavenumbers (1/cm), or approximately 42 meV, which is 7% greater than kT for the temperature (473 K=200 degrees Centigrade) at which the data of FIG. 1B were obtained. Consequently, because the separation between the blue satellite of the D2 line and the D2 line itself is more than kT in energy, optically pumping the blue satellite results in lasing on the D2 line. If the system is pumped closer to the D2 line (for example between 765 and 780 nm in FIG. 1B), lasing will not occur.

Most research efforts are directed toward improving the performance of traditional three and four level laser systems by enhancing the efficiency of the pumping mechanism. It is well known that a population inversion is necessary to realize a laser, but that direct pumping of the upper laser level from the lower laser level (which can be ground level or an elevated level) will not yield a population inversion between the two levels. Instead, the two levels can be equalized in theory that assumes use of an infinite pump source. Thus, theory instructs that a two level system cannot be inverted, i.e., the population of the more energetic of the two levels cannot exceed that for the lower of the two levels. With a strong pump source, the populations of the two levels can, at best, be equalized. This fails to produce the population inversion needed for lasing.

SUMMARY OF THE INVENTION

An embodiment of the invention is a laser pumping method. In the method, a primary amount of energy is pumped into a laser medium to populate an intermediate level near an upper laser level. A lesser amount of energy is pumped into the laser medium to populate an excited level that lies above the upper laser level and transfers atomic or molecular population to the upper laser level by a nonradiative process. In preferred embodiments, the intermediate level is within a few kT of the upper laser level and the primary amount of energy is a large majority of the total energy.

An embodiment of the invention is a laser device. The device includes a laser medium supporting four levels, including a lower laser level, an upper laser level, an excited level above the laser level from which population transfers to the upper laser level via nonradiative transistion, and an intermediate level within a few kT of the upper laser level. A primary energy pump pumps population from the lower laser level to the intermediate level. A second energy pump having substantially less energy than the primary energy pump pumps population to the excited level. In preferred embodiments, the intermediate level is within a few kT of the upper laser level and the primary amount of energy is a large majority of the total energy.

DETAILED DESCRIPTION OF THE PREFERRED EMBODIMENTS

A method of the invention is a laser pumping method. In the laser pumping method of the invention, a primary pump populates an intermediate level that is near (measured by thermal energy) of the upper laser level (Level 3 in FIGS. 1 and 2). The primary pump preferably delivers a large majority of the total pump power to an intermediate level that lies within a few kT (where kT is the thermal energy) of the laser level. A secondary pump pumps significantly less power to a level (a level from which a fast transition occurs to the laser level—Level 2 in FIGS. 1 and 2) that is an excited level above the upper laser level (corresponding to a conventional highly excited level).

The invention directs most power toward pumping to the intermediate level that exists near the upper laser level (within a few kT) in a laser medium that supports the intermediate level. In methods of the invention, most of the available pump power is devoted to driving a two level system, but a second weaker pump is directed toward populating the upper laser level by another route. The second, weaker pump induces stimulated emission on the desired transition (rather than the transition driven by the strong pump) and is thus able to drive the system over threshold, producing lasing. Without the secondary pump, the strong pump alone will produce no lasing on the desired transition because the strong pump alone would be driving a two-level system. This also provides a control method that can use relatively small amounts of energy to switch the laser via control of the secondary pump.

Methods of the invention contradict the manner in which three (and four) level lasing systems have been pumped for the past 50 years. However, methods of the invention can produce more efficient lasers of higher average power than known lasers.

Preferred embodiments of the invention provide large pump acceptance bandwidths, typically >5 nm, while avoiding the need for diode binning, line narrowing and phase locking.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Example embodiments use an optically pumped system. The primary pump and secondary pump are then realized with two different wavelengths, e.g., two colors.

Figure 2:
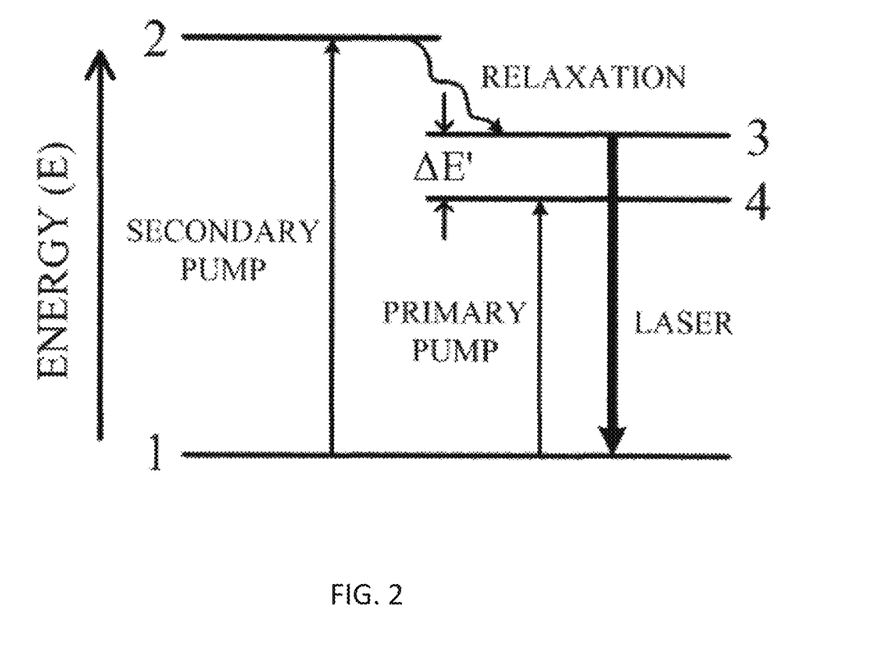
FIG. 2 illustrates the energy diagram of a laser pumping method of the invention.

A method of the invention is illustrated in FIG. 2 for a three level laser of the invention. Level 1 is the ground level, Level 2 is an excited level from which population is typically transferred to upper laser level 3 by a nonradiative process. The intermediate level 4 lies within a few kT of the upper laser level 3. While shown below the upper laser level 3, it can also be above upper laser level 3. When the intermediate level 4 is below the upper laser level 3, then cooling of the laser medium is provided as an additional benefit. This represents a particularly preferred embodiment, and is especially advantageous for high power lasers.

Figure 3:
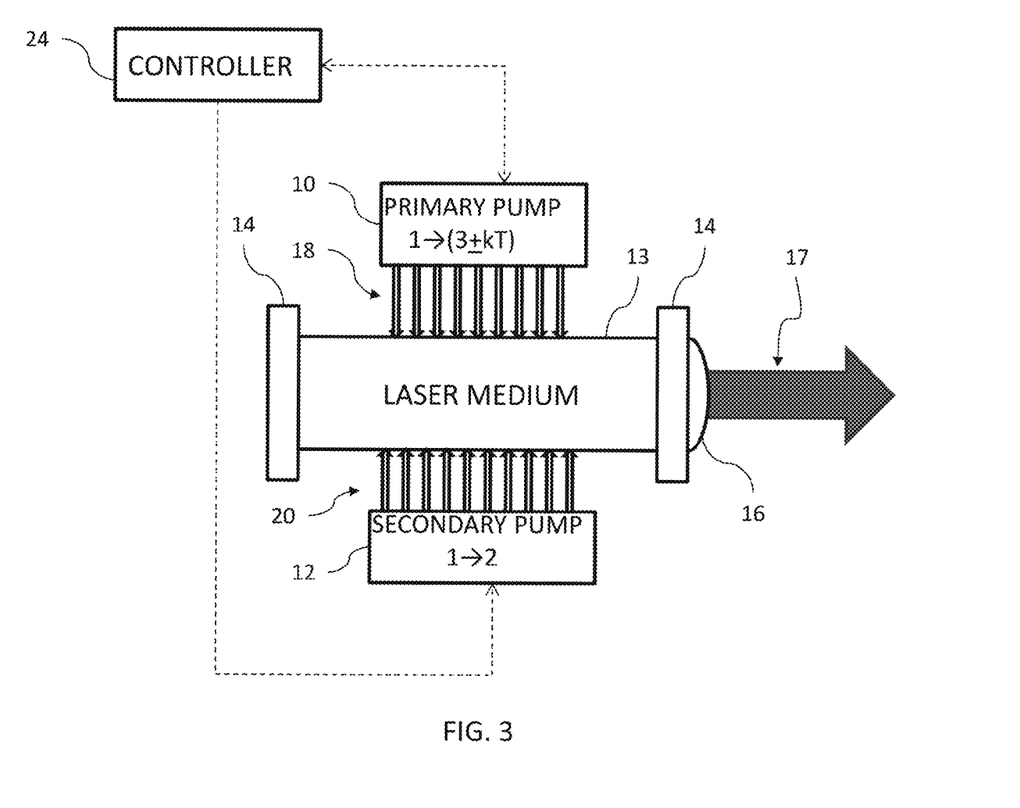
FIG. 3 is a block diagram that illustrates a preferred laser device of the invention.

FIG. 3 is a block diagram showing an optically pumped laser system of the invention that can implement the method of FIG. 2. In the system of FIG. 3, a first optical pump 10 that pumps to intermediate level 4 and a second optical pump 12 that pumps to level 2. Energy is pumped into a laser medium 13, e.g., a gas laser medium or a crystal. Mirrors 14 create feedback, and a lens 16 focuses and exit laser beam 17, which can be a high power beam (e.g., tens of Watts to hundreds of or greater and into the kW range and multiple kW weapons power ranges). The radiation 18 from pump 10 will have a first predetermined wavelength, and the radiation 20 from pump 12 will have a second predetermined wavelength. The wavelengths will depend upon the medium. The primary pump 10 has the bulk of the power, as controlled by a controller 24. The primary pump 10 populates the energetic Level 4 in FIG. 2. The secondary pump receives a small amount of power, but populates energetic Level 2, and is necessary to create a population inversion for lasing. The controller 24 can therefore use the secondary pump as a fast switching control. The operation can be well understood by artisans with reference in FIG. 2.

FIG. 3 illustrates a transverse pumping arrangement, but axial pumping arrangements are also possible. An example axial pumping arrangement is shown in FIG. 10 of Verdeyen et al., U.S. Pat. No. 7,804,877, which is incorporated herein. The FIG. 10 configuration of the '877 patent can be modified with a second pump diode directed toward the primary pump band of FIG. 2 in the present application to populate energetic Level 4.

In FIG. 2, Level 4 lies slightly above or below the upper laser level (Level 3). Levels 3 and 4 can be considered thermally mixed, and effectively act in some respects as a single level. The energy separation between 3 and 4 is $\Delta E'$ which is on the order of thermal energy (a few kT) or less. Not only is Level 4 in proximity to Level 3 but a laser medium supports that level 4 can be pumped efficiently from Level 1. Advantageously, this implies that the absorption coefficient associated with the $1 \rightarrow 4$ transition in FIG. 2 is large. This contrasts with the traditional weak $1 \rightarrow 2$ transition.

In preferred embodiments, optical pumping is used, as illustrated in FIG. 3. Two different wavelengths (channels) of pumping light provide a "two color" approach. Most of the power is delivered to the laser medium by the "Primary Pump." For example, in one embodiment, 90% of pump power is provided to the primary pump, and 10% to the secondary pump. This contrasts with typical lasers, where all pump power is devoted toward populating Level 2. In the invention, the burden of populating the intermediate level 4 that is proximate the laser level 3 is carried by the primary pump as illustrated in FIGS. 2 and 3. Considerably less power is delivered to the laser medium by the secondary pump which drives the $1 \rightarrow 2$ transition.

The method of FIG. 2 can be much more efficient than typical pumping compared to the conventional pumping of FIG. 1A, and especially in the case of high power lasers. With the intermediate level 4 being within a few kT of the laser Level 3, the population of Level 4 is very efficiently transferred to Level 3 by collisions (for a gas phase laser) or photon interactions (in a solid). Therefore, when lasing begins, energy stored in Levels 3 and 4 will be extracted efficiently.

FIG. 2 illustrates a preferred embodiment that uses a laser medium that supports and pumps to a Level 4 that is $\Delta E'$ below upper laser Level 3. Other embodiments use a laser medium that supports and pumps to a Level 4 that is $\Delta E'$ above upper laser Level 3.

The preferred embodiment of FIG. 2 provides an important additional advantage. Because Level 4 lies below Level 3 (in the embodiment of FIG. 2), lasing on the $3 \rightarrow 1$ transition will actually cool the laser medium slightly. That is, each laser photon emitted by the medium removes $\Delta E'$ in energy, thereby lowering the medium temperature slightly. This is an enormous asset for high power lasers (>tens of watts). Conventional high power lasers have significant cooling problems that generally increase with higher pumping levels. The method of FIG. 2 dramatically reduces the dependence upon the $1 \rightarrow 2$ pumping transition and its well-known poor quantum efficiency.

Additionally, the 1→4 transition is that the quantum efficiency associated with pumping the 1→4 transition can be, for example, 90% to more than 100%. The system requires the secondary pump. Lasing is not normally obtainable on the 3→1 transition when pumping on the 1→4 transition alone because levels 3 and 4 are essentially degenerate. The primary pump can drive the system to the threshold of lasing (basically close to or at optical transparency), and the secondary pump drives the system over threshold. Advantageously, the strong 1→4 transition populates Levels 3 and 4 efficiently while simultaneously cooling the laser medium. Levels 3 and 4 are effectively mixed because energy separation between 3 and 4 is ΔE' which is on the order of thermal energy (a few kT) or less.

The laser medium used must provide level 4. Atomic and molecular systems can provide level structure of FIG. 2, and some have been used in spectroscopy. The invention can, for example, provide high, power lasers in both gas and solid state systems. As a specific example, alkali-rare gas diatomics are well-matched to the FIG. 2 energy diagram.

Figure 4:
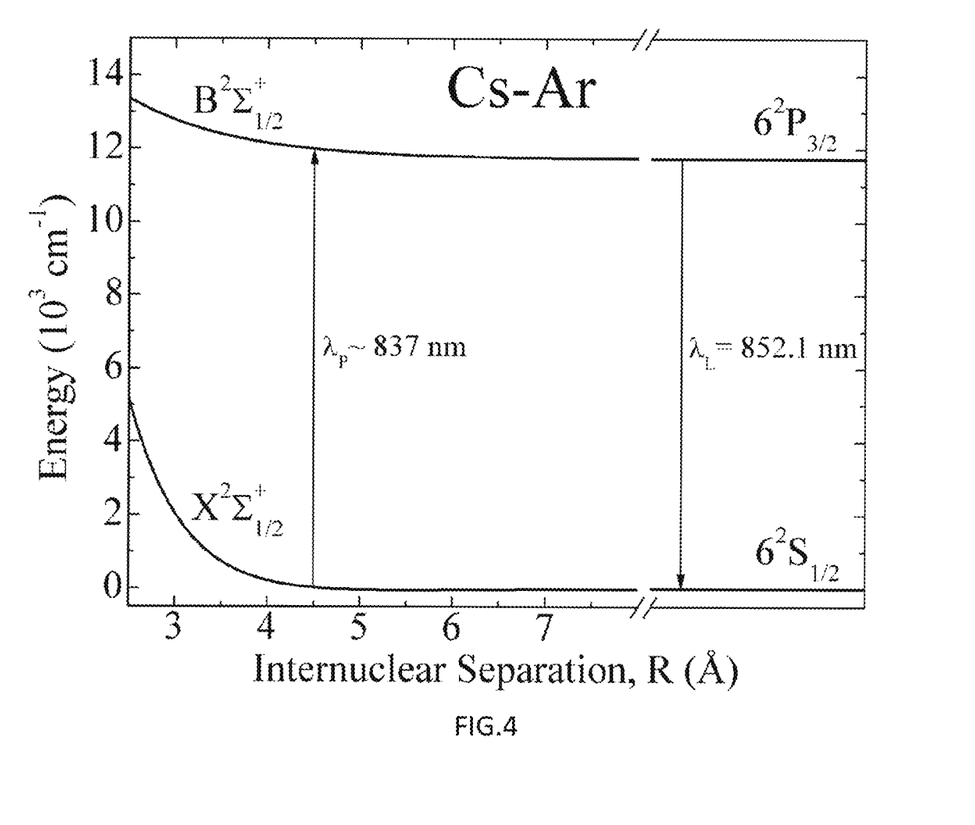
FIG. 4 is a diagram illustrating energy as a function of the internuclear separation for a Cs—Ar laser medium.
Figure 5:
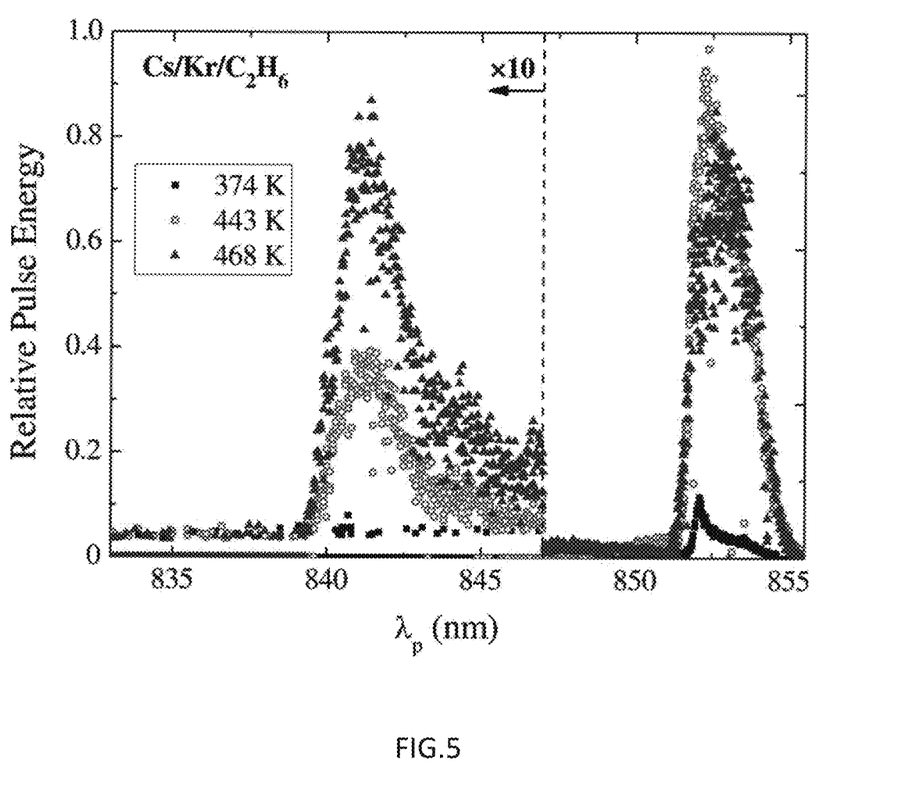
FIG. 5 is a plot illustrating a broad red shoulder (satellite) available to pump as a primary pumping band in a method of the invention in a $Cs/Kr/C_2H_6$ laser medium.
Figure 6:
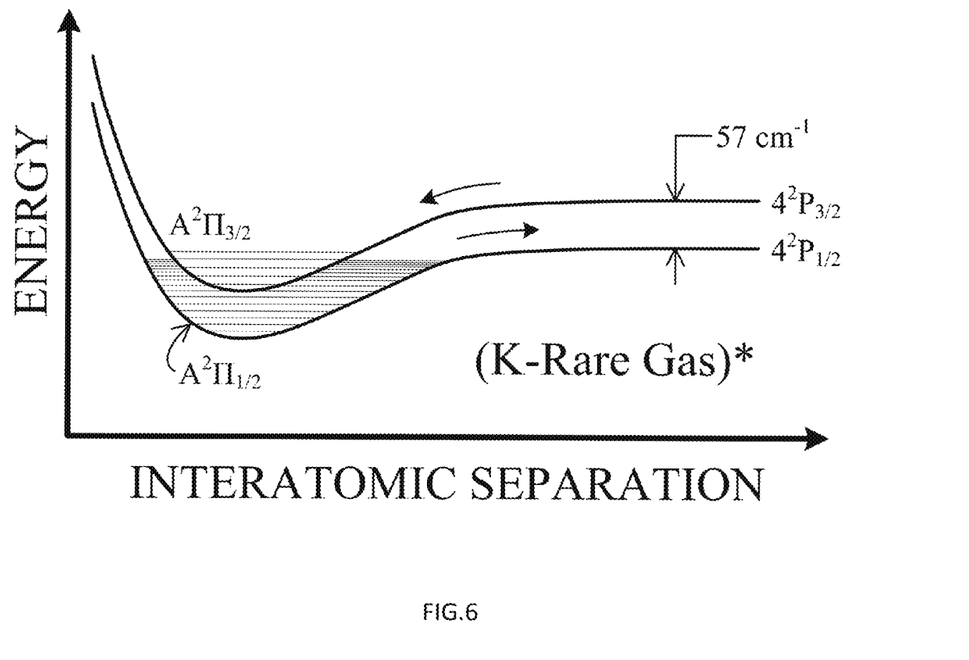
FIG. 6 illustrates a thermally mixed level that can be pumped as the primary pumping band in accordance with the invention for a K-rare gas laser medium.

Preferred embodiments are atomic lasers by the dissociation of an alkali-rare gas complex, such as Cs—Ar and Cs—Ar—Xe mixtures. FIG. 4 is a diagram illustrating energy as a function of the internuclear separation for Cs—Ar. A level 2 normal pump band $\lambda_P \sim 837$ nm is and the laser level 3 (metastable level) at $\lambda_P \sim 852.1$ nm. In the invention, a primary pump is pumped within a broad red shoulder of the $D_2$ transition that is available in the 852-854 nm range. The shoulder is illustrated in FIG. 5. The Red shoulder strongly populates Cs ($6^2P_{3/2}$) Level ($D_2$ line upper level). FIG. 6 illustrates a thermally mixed Level that can be pumped with the invention. Pumping can be on the $D_2$ line or region between $D_1$ and $D_2$ transitions. There is a Rapid $4^2P_{1/2} \rightarrow 4^2P_{3/2}$ transfer ($\Delta E = 57$ cm$^{-1}$).

Figure 7:
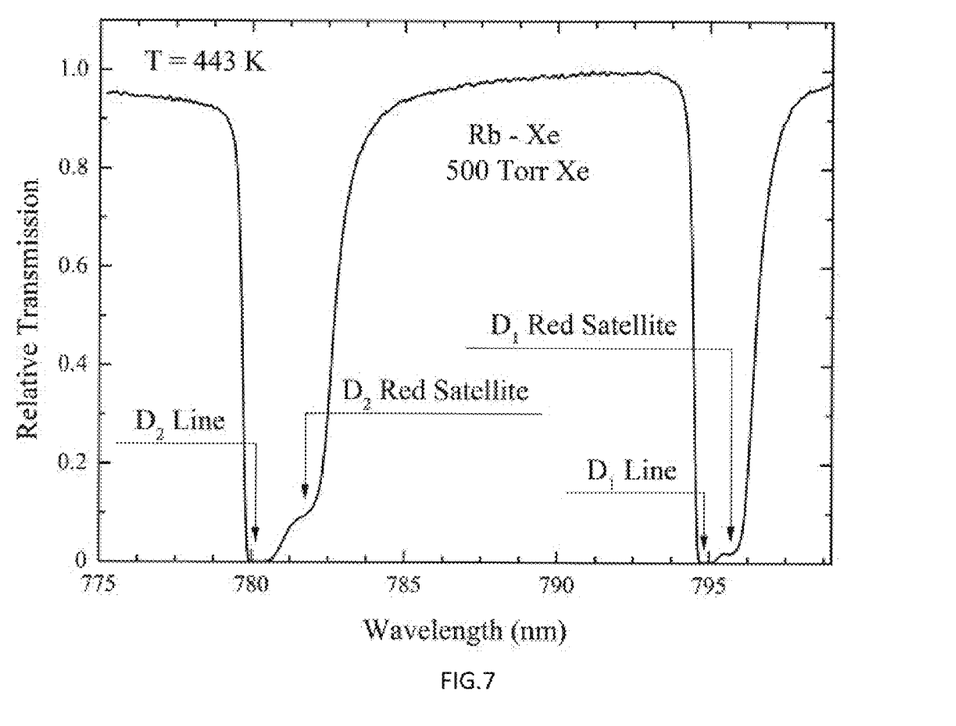
FIG. 7 is an absorption spectrum (relative transmission v wavelength) for a mixture of rubidium (Rb) vapor and Xe gas illustrating a laser system and pumping in accordance with an embodiment of the invention having dual energy (channel) pumping bands.
Figure 8:
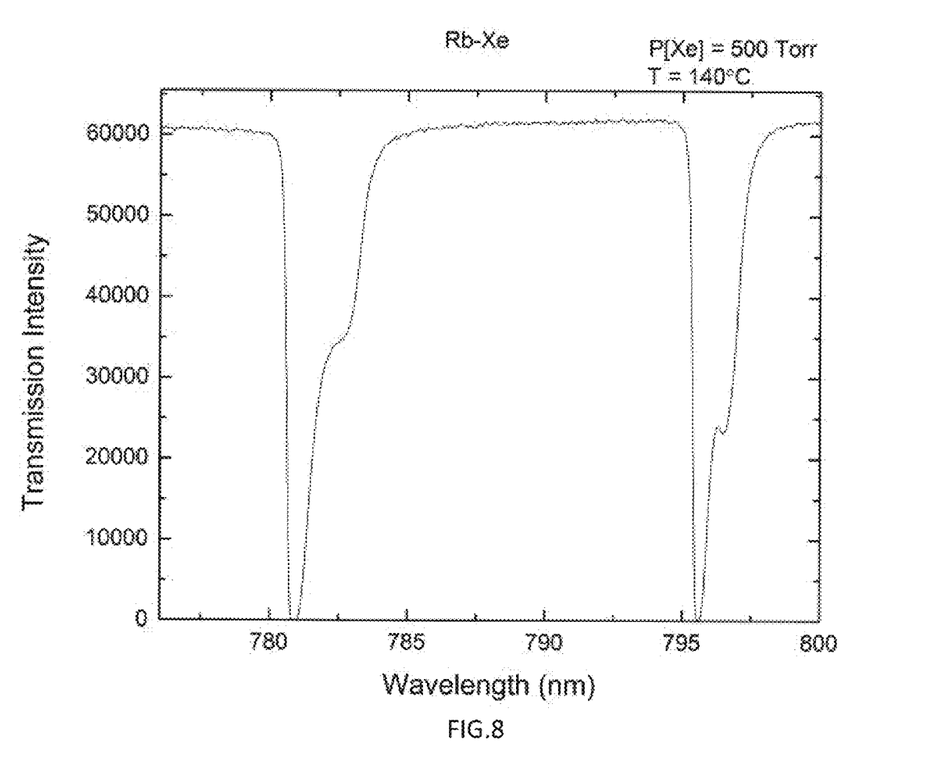
FIG. 8 is an absorption spectrum (transmission intensity v wavelength) for a mixture of rubidium (Rb) vapor and Xe gas illustrating a laser system and pumping in accordance with an embodiment of the invention having dual energy (channel) pumping bands.

One particular embodiment of the invention is an improvement of the laser system of FIG. 1B. An objective of the present invention is providing lasing efficiently while still pumping a state lying within kT of the upper laser level. FIG. 7 illustrates such a system. The absorption spectrum is similar to that of FIG. 1B (for a mixture of metal vapor and noble gas, in particular an embodiment with Rb vapor and Xe gas) but recorded over the 775-798 nm region. Transmission of 1.0 corresponds to no absorption by the metal vapor/gas mixture. The spectrum of FIG. 7 does not completely and accurately represent the Rb D2 and D1 absorption profiles because absorption at these wavelengths (780 and 795 nm, respectively) is clearly saturated. A more accurate (unsaturated) absorption spectrum for the Rb—Xe system in this wavelength region is shown in FIG. 8. The purpose of FIGS. 7 and 8 is to indicate the positions and spectral widths of the red satellites associated with the D1 and D2 lines of an alkali atom (Rb, in this case) in an alkali-rare gas mixture. Artisans will note, for example, that the width of the D2 red satellite (determined by deconvolution from the D2 line profile itself) is roughly 1 nm. Such a width allows for optical pumping with semiconductor diode lasers without the requirement for line-narrowing. One particular embodiment uses the of this invention is to photopump as the primary pump, for example, the D2 red satellite that peaks at approximately 781.4 nm and also pump, as the secondary pump, the blue satellite (760 nm) simultaneously in order to obtain lasing on the Rb D2 line at 780 nm. With the invention, pumping the D2 red satellite with the majority of pumping power populates a state lying below the upper state for the D2 line. Every photon absorbed at 781.4 nm (red satellite) that also produces a laser photon at 780 nm and advantageously results in a slight cooling of the medium.

With reference to FIG. 7, another embodiment of the invention is achieved by primarily photo pumping the D1 red satellite and secondarily photo pumping one of the D2 red satellite, the D2 blue satellite or the D2 line directly, which obtains lasing on the D1 line (795 nm). The primary amount of the required pump power is delivered into the red D1 satellite which, if pumped alone, would not result in lasing on the D1 line of Rb.

Artisans will recognize that the examples provide guidance for the selection and testing of particular laser media that can provide the necessary Level 4 to implement the invention. Artisans will recognize that other laser mediums can be used and support the invention.

Testing is expected to reveal, for example, that tens of watts at 852.1 nm or 894.3 nm in the near-infrared can be generated with the invention when Cs—Ar—Xe mixtures are pumped by semiconductor laser bars. Combined with frequency-doubling, this laser is modeled to yield more than 10 watts of violet (426 or 447 nm). This is a region of the spectrum for which few powerful sources exist. This can be provided in a compact physical form, having a volume of less than about 1 ft$^3$. This laser is well-suited for many applications, examples of which include photochemical processing, displays (used to pump RGB sources) and digital optical disk mastering. The invention is also applicable to high value solid state lasers, such as the Nd and Er systems. In such systems, the invention can reduce thermal loading of the crystal. In conventional Nd, Er and other solid state systems, thermal loading is an important performance limiting issues that causes distortion in the spatial profile of the laser beam.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A laser pumping method, comprising pumping a primary amount of energy into a laser medium to populate an intermediate level near an upper laser level, and pumping a lesser amount of energy into the laser medium to populate an excited level that lies above the upper laser level and transfers atomic or molecular population to the upper laser level by a nonradiative process.

2. The method of claim 1, wherein the primary amount of energy brings the medium close to lasing threshold and the lesser amount of energy produces a population inversion between the upper laser level and a lower laser level.

3. The method of claim 1, wherein the intermediate level is within few kT of the upper laser level.

4. The method of claim 1, wherein said primary and lesser amounts of energy are provided by optical pumping.

5. The method of claim 1, wherein the primary amount of energy delivered by the primary pump is a large majority of the total pump power delivered by the primary amount of energy and the lesser amount of energy.

6. The method of claim 5, wherein the primary amount of energy comprises ~90% of the total pump power.

7. The method of claim 1, further comprising controlling the lesser amount of energy to switch a laser output on and off.

8. The method of claim 1, wherein the intermediate level is below the upper laser level such that lasing will cool the laser medium.

9. The method of claim 8, wherein the intermediate level is within few kT below the upper laser level.

10. A laser device, the device comprising:
 a laser medium supporting four levels, including a lower laser level, an upper laser level, an excited level above the laser level from which population transfers to the upper laser level via nonradiative transistion, and an intermediate level within a few kT of the upper laser level;
 a primary energy pump for pumping population from a lower laser level to the intermediate level; and
 a second energy pump for pumping, with substantially less energy than the primary energy pump, population from the lower laser level to the excited level.

11. The device of claim 10, wherein said laser medium comprises a gas laser medium.

12. The device of claim 10, wherein said laser medium comprises a solid state laser medium.

13. The device of claim 10, wherein said primary and secondary energy pumps comprise optical pumps having different wavelengths.

14. The device of claim 10, wherein the lower laser level is a ground state.

15. The device of claim 10, wherein the primary pump delivers a large majority of the total pump power delivered by the primary and second energy pumps.

16. The device of claim 15, wherein the primary pump delivers ~90% of the total pump power.

17. The method of claim 1, wherein the intermediate level is below the upper laser level such that lasing will cool the laser medium.

18. The method of claim 1, wherein the laser medium comprises an alkali-rare gas diatomic.

19. The method of claim 18, wherein the laser medium comprises a Cs—Ar—Xe mixture.

20. The device of claim 10, wherein the laser medium comprises an alkali-rare gas diatomic.

21. The device of claim 20, wherein the laser medium comprises a Cs—Ar—Xe mixture.

22. The device of claim 4, wherein said primary and lesser amounts of energy are provided by optical pumping at separate wavelengths.

* * * * *